United States Patent
Byun et al.

(10) Patent No.: US 8,842,347 B2
(45) Date of Patent: Sep. 23, 2014

(54) IMAGE SCANNING APPARATUS AND PAPER TRANSFER METHOD OF THE IMAGE SCANNING APPARATUS

(75) Inventors: Ji-Young Byun, Suwon-si (KR); Ho-bin Hwang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 13/612,011

(22) Filed: Sep. 12, 2012

(65) Prior Publication Data

US 2013/0070318 A1 Mar. 21, 2013

(30) Foreign Application Priority Data

Sep. 15, 2011 (KR) .................. 10-2011-0093088

(51) Int. Cl.
*H04N 1/04* (2006.01)
*H04N 1/00* (2006.01)

(52) U.S. Cl.
CPC ....... *H04N 1/00588* (2013.01); *H04N 1/00599* (2013.01); *H04N 1/00652* (2013.01)
USPC ............ 358/498; 358/474; 358/497; 358/484

(58) Field of Classification Search
USPC .................. 358/498, 474, 497, 484
See application file for complete search history.

(56) References Cited

U.S. PATENT DOCUMENTS

| | | | | |
|---|---|---|---|---|
| 5,982,503 A | * | 11/1999 | Miyamoto et al. | 358/400 |
| 8,384,315 B2 | * | 2/2013 | Shin et al. | 318/51 |
| 2005/0229906 A1 | * | 10/2005 | Hosoya | 123/457 |
| 2005/0281545 A1 | * | 12/2005 | Sugimoto et al. | 388/805 |
| 2011/0062900 A1 | | 3/2011 | Shin et al. | |
| 2013/0058683 A1 | * | 3/2013 | Doshida | 399/167 |

FOREIGN PATENT DOCUMENTS

| | | |
|---|---|---|
| JP | 2002-58278 | 2/2002 |
| JP | 2009-183055 | 8/2009 |
| KR | 10-2005-0042625 | 5/2005 |
| KR | 10-2011-0029407 | 3/2011 |

* cited by examiner

*Primary Examiner* — Houshang Safaipour
(74) *Attorney, Agent, or Firm* — Staas & Halsey LLP (57) ABSTRACT

An image scanning apparatus includes a scanning unit which scans paper, a paper transfer unit which transfers the paper to the scanning unit using a BLDC (Brushless DC) motor, a sensor unit which senses driving information of the BLDC motor, a scan controlling unit which controls operations of the scanning unit, and generates a control command including information regarding a driving direction of the BLDC motor, a driving signal unit which generates a driving signal for controlling the BLDC motor, and a digital controlling unit which controls operations of the driving signal unit in a digital method based on a generated control command, sensed driving information and a digital gain value according to a driving direction of the BLDC motor.

20 Claims, 6 Drawing Sheets

IMAGE SCANNING APPARATUS AND PAPER TRANSFER METHOD OF THE IMAGE SCANNING APPARATUS

CROSS-REFERENCE TO RELATED APPLICATIONS

This application claims priority from Korean Patent Application No. 2011-0093088, filed in the Korean Intellectual Property Office on Sep. 15, 2011, the disclosure of which is incorporated herein by reference.

BACKGROUND

1. Field

Methods and apparatuses consistent with the exemplary embodiments relate to an image scanning apparatus and paper transfer method of the image scanning apparatus, and more particularly, to an image scanning apparatus using a Brushless DC (BLDC) monitor for transferring paper, and a paper transfer method of the image scanning apparatus thereof.

2. Description of the Related Art

An image scanning apparatus is an apparatus which scans an original image of a document, picture or film, and converts the scanned image into digital data. In this case, the digital data can be displayed on a monitor of a computer or printed by a printer and generated then as an output image. Examples of such an image scanning apparatus are a scanner, copier, facsimile, and multi function peripheral (MFP) which embodies these functions in one apparatus.

In such an image scanning apparatus, numerous motors are used to perform various functions such as transferring printing paper or supplying printing paper. Recently, as it is possible to attach option units which perform various functions to an image scanning apparatus, the number of motors that can be used in an image scanning apparatus is increasing.

It is a recent trend to use a BLDC motor in an image scanning apparatus in order to prevent noise from occurring when driving the image scanning apparatus. A BLDC motor is a brushless motor that performs rectification electronically, and thus since a mechanical rubber is removed from between a brush and a rectifier, the motor has higher speed and less noise.

As aforementioned, a BLDC motor doesn't have a brush structure. Therefore, in the sense that it is necessary to sense location information of a rotator using a Hall sensor and to approve power on each phase of the BLDC motor in consecutive order and control the approved power, a driving circuit is used.

The conventional method was to control the BLDC motor using an analogue Phase-Locked Loop (PLL) type driving circuit.

However, it is difficult to apply such an analogue PLL type BLDC motor to an image scanning apparatus. The most important thing in a motor used in an image scanning apparatus is not only speed but also whether or not the speed is maintained constant in various speed bands that can cover expansion/reduction. However, in an analogue PLL type BLDC motor, a gain value of a driving circuit for maintaining a constant speed is fixed to an external device using resistance and capacitor, and once the gain value is fixed, it cannot be changed until the components are replaced. Therefore, a constant speed can only be maintained in a certain speed band. (That is, it is possible to reach a constant speed in a certain speed band according to the gain value of the driving circuit, but in speed bands that cannot be covered by the gain value of the driving circuit, an overshoot or undershoot occurs, delaying the time needed to reach the constant speed.) Therefore, in the case of applying an analogue PLL type BLDC motor to an image scanning apparatus, the problem is that it is impossible to maintain a constant speed in various speed bands.

In addition, since the conventional analogue PLL type BLDC motor cannot maintain a constant speed in various speed bands, an overshoot or undershoot occurs in speed bands that cannot be covered by the gain value of the driving circuit, causing loud noise during operations of the image scanning apparatus, incorrect paper front-end margins, distorted paper image definition, and lengthening paper dragging distance during a both sides scanning.

SUMMARY

Additional aspects and/or advantages will be set forth in part in the description which follows and, in part, will be apparent from the description, or may be learned by practice of the invention.

An aspect of the exemplary embodiments relates to an image scanning apparatus for controlling a BLDC motor in a digital method to maintain a constant speed in various speed bands and a paper transfer method thereof.

According to an exemplary embodiment of the present disclosure, an image scanning apparatus may include a scanning unit which scans paper; a paper transfer unit which transfers the paper to the scanning unit using a Brushless DC (BLDC) motor; a sensor unit which senses driving information of the BLDC motor; a scan controlling unit which controls operations of the scanning unit, and generates a control command including information on a driving direction regarding the BLDC motor; a driving signal unit which generates a driving signal for controlling the BLDC motor; and a digital controlling unit which controls operations of the driving signal unit in a digital method based on a digital gain value according to the sensed driving information and the driving direction of the BLDC motor.

The image scanning apparatus may further include a storage unit which stores the digital gain value corresponding to a command speed and driving direction of the BLDC motor in a lookup table.

The digital controlling unit may include an error detection unit which compares a speed command value and a driving direction within the generated control command with the sensed driving information, and calculates a digital error value; a calculating unit which calculates a Pulse Width Modulation (PWM) duty ratio of the BLDC motor using the calculated digital error value and the digital gain value; and a PWM generating unit which generates a PWM signal regarding the BLDC motor based on the calculated PWM duty ratio.

The error detection unit may include a frequency error detection unit which compares the speed command value and the driving direction within the generated control command with the speed information of the BLDC motor, and calculates a frequency error value; and a phase error detection unit which compares the speed command value within the received control command and the driving direction and the speed information of the BLDC motor, and calculates a phase error value.

The calculating unit may calculate the PWM duty ratio by performing a shift calculation on the calculated frequency error value and the calculated phase error value and the digital gain value corresponding thereto.

The sensor unit may include an electrical angle sensing unit which receives electrical angle information from a Hall sensor attached to the BLDC motor; and a speed sensing unit which receives speed information of the BLDC motor in a frequency form.

The control command may include a rotation direction regarding the BLDC motor, and may further comprise at least one information of a speed command value, rotation start/ stop, acceleration/deceleration, brake operation and lock time.

The digital controlling unit may include a register which stores the generated control command.

The paper transfer unit may transfer the paper to the scanning unit using a plurality of BLDC motors. The sensor unit, the digital controlling unit and the driving signal unit may be provided in plural so as to correspond to each of the plurality of BLDC motors, respectively, and the communication interface unit may transmit the received digital control command to the digital controlling unit corresponding to the received digital control command of the plurality of digital controlling units.

The driving information may be at least one of the electrical angle information of the BLDC motor and the rotation speed information of the BLDC motor.

According to an exemplary embodiment of the present disclosure, a paper transfer method of an image scanning apparatus may include generating a control command which includes information on a driving direction regarding a BLDC motor in response to a scan command; sensing driving information of the BLDC motor; generating a driving signal for controlling the BLDC motor based on the generated control command and a digital gain value according to the sensed driving information and the driving direction of the BLDC motor; and providing the generated driving signal to the BLDC motor.

The generating the driving signal may generate a driving signal using a predetermined lookup table which stores a digital gain value corresponding to a command speed and driving direction of the BLDC motor.

The generating the driving signal may include comparing a speed command value and the driving direction within the generated control command with the sensed driving information, and calculating a digital error value; calculating a PWM duty ratio of the BLDC motor using the calculated digital error value and the digital gain value; and generating a PWM signal regarding the BLDC motor based on the calculated PWM duty ratio.

The calculating the digital error value may include comparing the speed command value and the driving direction within the generated control command with the speed information of the BLDC motor, and calculating a frequency error value; and comparing the speed command value and the driving direction within the generated control command with the speed information of the BLDC motor, and calculating a phase error value.

The calculating the PWM duty ratio may calculate the PWM duty ratio by performing a shift calculation on the calculated frequency error value, the calculated phase error value, and the digital gain value corresponding thereto.

The sensing the driving information of the BLDC motor may include receiving electrical angle information from a Hall sensor attached to the BLDC motor; and receiving speed information of the BLDC motor in a frequency form.

The control command may include a rotation direction regarding the BLDC motor, and further comprises at least one information of a speed command value, rotation start/stop, acceleration/deceleration, brake operation, and lock time.

The driving information may be at least one information of the electrical angle information of the BLDC motor and the rotation speed information of the BLDC motor.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Reference will now be made in detail to the embodiments, examples of which are illustrated in the accompanying drawings, wherein like reference numerals refer to the like elements throughout. The embodiments are described below to explain the present disclosure by referring to the figures.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

Figure 1:
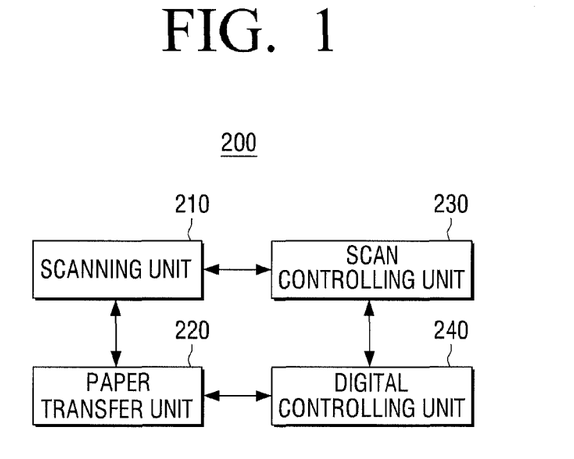
FIG. 1 is a block diagram illustrating a configuration of an image scanning apparatus according to an exemplary embodiment of the present disclosure.

FIG. 1 is a block diagram illustrating a configuration of an image scanning apparatus according to an exemplary embodiment of the present disclosure. Referring to FIG. 1, the image scanning apparatus 200 may include a scanning unit 210, a paper transfer unit 220, a scan controlling unit 230, and a digital controlling unit 240.

The scanning unit 210 may scan an original image of a document written on paper or picture.

More specifically, the scanning unit 210 may include a lens unit (not illustrated) which forms light reflected from paper on an image sensor inside. The scanning unit 210 may scan image information of the paper from the light formed on the image sensor.

Herein, the image sensor of the scanning unit 210 may be embodied as a CIS (CMOS image sensor) or a CCD (Charge Coupled Device).

When paper to be scanned is input into the image scanning apparatus 200, the paper transfer unit 220 may transfer the paper input by control of the scan controlling unit 230 along a paper transfer route.

More specifically, the paper transfer unit 220 may transfer the paper input into an input tray of the image scanning apparatus 200 through the scanning unit 210 to an output tray by a roller which is driven using at least one BLDC motor.

Herein, the paper transfer unit 220 may include two paper transfer routes. That is, the paper transfer unit 220 may include a paper transfer route for a one side scanning and a paper transfer route for a both sides scanning. This will be explained in more detail with reference to FIG. 5.

The scan controlling unit 230 may control the entire operation of the image scanning apparatus 200 related to scanning.

More specifically, when a scan command is input from a user, the scan controlling unit 230 may control the paper transfer unit 220 to transfer the paper input to the input tray of the image scanning apparatus 200 to the scanning unit 210.

In addition, when the transferred paper reaches the scanning unit 210, the scan controlling unit 230 may control the scanning unit 210 to perform a scanning operation.

Herein, when the scan command input from the user is a one side scan command, the scan controlling unit 230 may control the paper transfer unit 220 to output the paper scanned by the scanning unit 210 to the output tray of the image scanning apparatus 200.

In addition, when the scan command input from the user is a both sides scan command, the controlling unit 230 may control the paper transfer unit 220 to transfer the paper scanned by the scanning unit 210 to a paper transfer route for a both sides scanning.

Meanwhile, the scan controlling unit 230 may generate a control command regarding the BLDC motor which drives the paper transfer unit 220.

Herein, the control command may include a rotation direction (herein, the rotation direction may include a normal rotation direction and a reverse rotation direction). In addition, the control command may further include at least one information of a speed command value (required speed of the BLDC motor), rotation start/stop, acceleration/deceleration, brake operation and lock time (waiting time until the motor reaches a normal state, voltage blocking time for protecting the motor after a predetermined time etc.) regarding the BLDC motor.

The digital controlling unit 240 may control driving regarding the BLDC motor.

More specifically, the digital controlling unit 240 may control operations of a driving signal unit to be explained hereinafter based on a digital gain value according to at least one of the control command generated in the scan controlling unit 230, driving information sensed in a sensor unit to be explained hereinafter, and a driving direction of the BLDC motor and a command speed.

Herein, the digital gain value may be predetermined in a lookup table form in various values according to the command speed of the BLDC motor and the driving direction.

That is, the digital gain value may be predetermined in the lookup table form as in the following table.

TABLE 1

| index | Command speed (rpm) | Driving direction | gain |
|---|---|---|---|
| 1 | 500 | Normal direction | A |
| 2 | 500 | Reverse direction | B |
| 3 | 1000 | Normal direction | C |
| 4 | 1000 | Reverse direction | D |
| 5 | 1500 | Normal direction | E |
| 6 | 1500 | Reverse direction | F |
| 7 | 2000 | Normal direction | G |
| 8 | 2000 | Reverse direction | H |
| 9 | 2500 | Normal direction | I |
| 10 | 2500 | Reverse direction | J |

Herein, the digital gain value may be stored in a storage unit (not illustrated) and be predetermined in a firmware form.

Herein, the storage unit may be embodied, for example, as an RAM (Random Access Memory), Flash Memory, ROM (Read Only Memory), EPROM (Erasable Programmable ROM), EEPROM (Electronically Erasable and Programmable ROM), Register, Hard Disk, Removable Disk, Memory Card, and USB Memory.

In addition, since the digital gain value may be provided in a firmware form, the user may change the digital gain value to a desirable value.

In the above table, there are ten gain values, but the number is not limited to ten, and it is obvious for those skilled in the art that more gain values may be provided.

Meanwhile, the digital controlling unit 240 may control operations of the driving signal unit which generates the driving signal for controlling the BLDC motor in the digital method.

Figure 2:
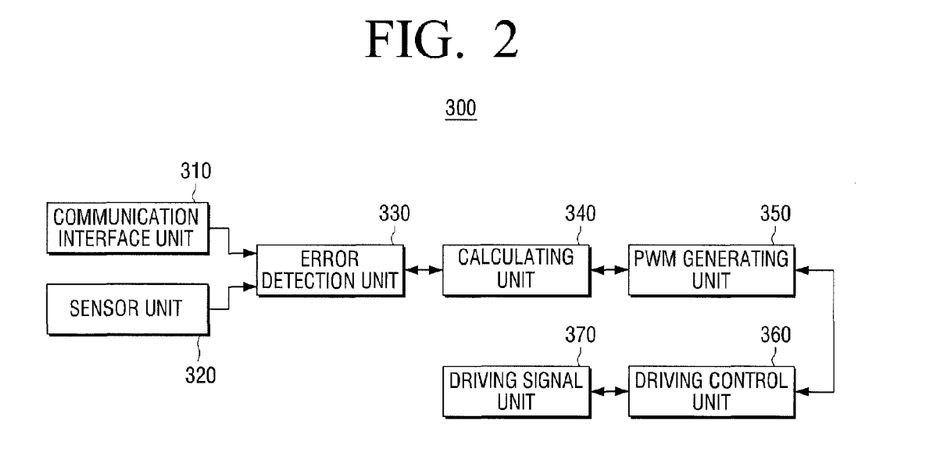
FIG. 2 is a block diagram illustrating a configuration of a motor control device according to an exemplary embodiment of the present disclosure.

That is, the digital controlling unit 240 may control output in the driving signal unit 370 based on a digital gain value according to at least one of the driving direction and the command speed of the BLDC motor within the control command generated in the scan controlling unit 230. That is, the digital controlling unit 240 may control output characteristics of the three phase driving signal of the driving signal unit 370 for controlling the BLDC motor.

As aforementioned, an image scanning apparatus according to an exemplary embodiment of the present disclosure may pre-store various digital gain values according to the command speed and the driving direction of the BLDC motor, and may change the digital gain value, and thus can maintain a constant speed in various speed bands.

Hereinafter, operations and configuration of the digital controlling unit 240 are explained in more detail with reference to FIG. 2.

FIG. 2 is a block diagram illustrating the configuration of a motor control device which controls the BLDC motor according to an exemplary embodiment of the present disclosure. Referring to FIG. 2, the motor control device 300 according to an exemplary embodiment of the present disclosure may include a communication interface unit 310, a sensor unit 320, an error detection unit 330, a calculating unit 340, a PWM generating unit 350, a driving control unit 360, and a driving signal unit 370.

Herein, the digital controlling unit 240 may include the communication interface unit 310, the error detection unit 330, the calculating unit 340, the PWM generating unit 350, and the driving control unit 360.

In addition, the digital controlling unit 240 may be embodied as one ASIC chip including the communication interface unit 310, the error detection unit 330, the calculating unit 340, the PWM generating unit 350, and the driving control unit 360.

However, it is not limited to above, that is, the digital controlling unit 240 may be embodied as one ASIC chip including the driving signal unit 370. And when the digital controlling unit 240 has a low system performance, it may include only the communication interface unit 310, the error detection unit 330, and the calculating unit 340.

Meanwhile, the communication interface unit 310 receives the control command regarding the BLDC motor and transmits it to the digital controlling unit 240.

Herein, the communication interface unit 310 may include a serial interface (not illustrated) and a register (not illustrated).

The serial interface receives the control command used to control operations of the BLDC motor from the scan controlling unit 230. Herein, the control command may include at least one information of a rotation direction, speed command value, rotation start/stop, acceleration/deceleration, and brake operation and lock time regarding the BLDC motor.

Such a control command may be received from the scan controlling unit 240 through an interface such as SPI (Peripheral Interface) which is an interface enabling data exchange through serial communication between two devices, and a serial communication interface such as I2C (Inter-Integrated-Circuit) which is a two-way serial BUS.

In addition, the serial interface may scan the control signal in the received control command. More specifically, the serial interface may scan various control signals (or driving commands (for example, rotation direction regarding the BLDC motor, start/stop of speed command value, acceleration/deceleration, rotation direction, rotation speed, and brake operation)) regarding the BLDC motor in the control command received through at least one terminal.

Meanwhile, the serial interface may transmit state information of the BLDC motor to the scan controlling unit 230 etc. More specifically, the serial interface may transmit information such as preparation state per channel, temperature per channel, and whether or not there is excess current per channel to the scan controlling unit. For example, in the case where excess current regarding the BLDC motor is sensed during motor control operations, the serial interface may transmit such information to the scan controlling unit 230 and protect the motor.

The register may store the control command received from the serial interface. More specifically, the register 212 may store the control signal necessary for controlling the corresponding BLDC motor in the control signal which the serial interface scanned from among the received control commands.

The sensor unit 320 may sense driving information of the BLDC motor.

More specifically, the sensor unit 320 may include an electrical angle sensing unit, a speed sensing unit and a speed information generating unit.

The electrical angle sensing unit may receive electrical angle information from a Hall sensor attached to the BLDC monitor, and may transmit this information to the digital controlling unit 240.

The speed sensing unit may receive rotation speed information of the BLDC motor from the speed sensing sensor attached to the BLDC motor, and may transmit the rotation speed information (for example, a FG signal) in the received frequency form to the digital controlling unit 240.

The speed information generating unit may generate speed information regarding the BLDC motor using the received electrical angle information. More specifically, the speed information generating unit may convert the three phase electrical angle information received from the electrical angle sensing unit into a speed information signal.

The error detection unit 330 may compare the speed command value within the control command generated in the scan controlling unit 230, the driving direction, and the sensed driving information, and may calculate a digital error value. More specifically, the error detection unit 330 may consist of a frequency error detection unit and a phase error detection unit.

The frequency error detection unit may compare the speed command value regarding the BLDC motor, the driving direction and the speed information of the BLDC motor, and may calculate the frequency error value. More specifically, the frequency error detection unit may mutually compare the speed command value and the driving direction extracted from the communication interface unit 310, and the speed information of the BLDC motor sensed in the sensor unit 320, and may calculate the frequency error value.

The phase error detection unit may compare the speed command value and the driving direction regarding the BLDC motor, and the speed information of the BLDC motor, and may calculate the phase error value. More specifically, the phase error detection unit may mutually compare the speed command value and the driving direction extracted from the communication interface unit 310, and the speed information of the BLDC motor sensed in the sensor unit 320, and may calculate the phase error value.

The calculating unit 340 may calculate a PWM duty ratio of the BLDC motor using the calculated error value and the digital gain value of the digital controlling unit 240.

More specifically, the calculating unit 340 may calculate the PWM duty ratio regarding the BLDC motor using the frequency error value and the phase error value calculated in the error detection unit 330, and the pre-stored digital gain value. For example, the calculating unit 240 may calculate a command voltage (or the PWM duty ratio) regarding the BLDC motor using the mathematical formula 1 below.

$$\text{volt} = ((\text{FrequencyError} * FKP + \Sigma \text{FrequencyError} * FKI) + (\text{PhaseError} * PKP + \Sigma \text{PhaseError} * PKI) \quad [\text{Formula 1}]$$

Herein, the volt is the command voltage regarding the BLDC motor, the FrequencyError is the error value calculated in the frequency error detection unit 231, the PhaseError is the phase error value calculated in the phase error detection unit 232, the FKP (Frequency P Gain) is the P gain value regarding the frequency, the FKI (Frequency I Gain) is the I gain value regarding the frequency, the PKP (Phase P Gain) is the P gain value regarding the phase, and the PKI (Phase I Gain) is the I gain value regarding the phase.

In addition, the calculating unit 340 may know the error value between the speed command value and the current driving speed of the BLDC motor using the frequency error value calculated in the error detection unit 300. The calculating unit 340 may calculate the PWM duty ratio regarding the BLDC motor using the speed error value and the pre-stored digital gain value.

In addition, although only an exemplary embodiment which simultaneously performs the frequency control (control using the frequency error value) and the phase control (control using the phase error value) has been explained, it can also be embodied to perform only the frequency control or the phase control.

For instance, an exemplary embodiment of the present invention may also be embodied to perform only the frequency control in the case of an accelerated control regarding the BLDC motor, and only the phase control in the case where the BLDC motor reaches a constant speed. That is, other control methods may be used according to the operation state of the BLDC motor.

Meanwhile, the calculating unit 240 may calculate the PWM duty ratio using shift calculation. More specifically, the calculation in the form of Frequency Error*FKP in mathematical formula 1 can be converted into a form like mathematical formula 2.

$$\text{FrequencyError} * FKP = (\text{FrequencyError} >> X) + (\text{FrequencyError} >> X) + (\text{FrequencyError} >> X) \quad [\text{Formula 2}]$$

For instance, in the case where FKP=0.350, if the value of FKP is made as 0.349, it can be shown as in the following mathematical formula 3.

FrequencyError*0.3496=(FrequencyError>>2)+(FrequencyError>>4)+(FrequencyError>>5)+(FrequencyError>>8)+(FrequencyError>>9)   [Formula 3]

As aforementioned, the calculating unit 240 according to the exemplary embodiment may perform decimal point calculations using the shift calculation, and thus may become able to calculate the PWM duty ratio easily in a system having low resources.

The PWM generating unit 350 may generate a PWM signal regarding the BLDC motor based on the calculated PWM duty ratio. More specifically, the PWM generating unit 350 may generate the PWM signal according to the PWM duty ratio calculated in the calculating unit 340.

The driving control unit 360 may control the driving signal unit 370 based on the generated PWM signal and the sensed driving information. More specifically, the driving control unit 360 may control the driving signal generated in the driving signal unit 370 to be explained hereinafter based on the PWM signal generated in the PWM generating unit 350 and the electrical angle information received from the electrical angle sensor unit 360.

The driving signal unit 370 may generate a driving signal for controlling the BLDC motor. More specifically, the driving signal unit 370 may generate a three phase driving signal for controlling the BLDC motor based on a switching sequence.

As aforementioned, the motor control device 300 may perform controls regarding the BLDC motor using digital PLL, PID control methods, and thus may become able to easily change the control gain value regarding the BLDC motor. In addition, the motor control device 300 may be embodied as one ASIC chip, and thus may become able to embody an internal circuit more simply.

In explaining FIGS. 1 and 2, we explained only the form where one motor control device 200 controls one BLDC motor using a switching element unit 140, but it is also possible to embody a form where one motor control device 200 controls two or more BLDC motors, and also where one motor control device 200 controls the BLDC motor while controlling a DC motor at the same time.

Figure 3:
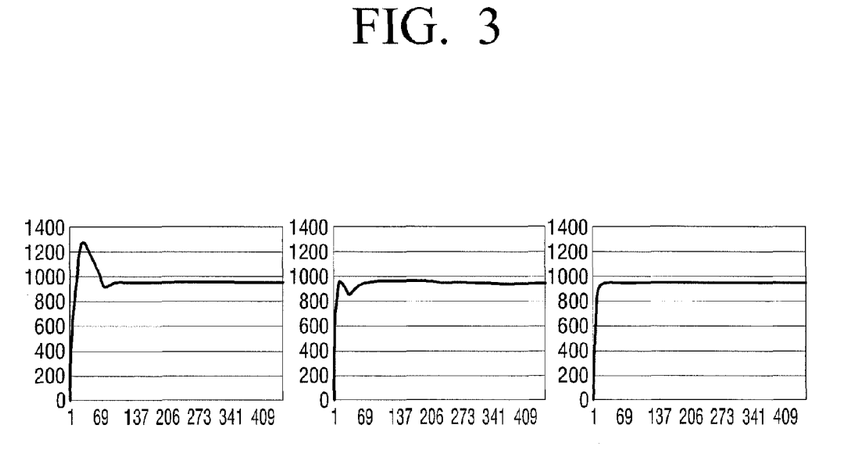
FIGS. 3 and 4 illustrate graphs showing effects in the case of controlling a BLDC motor in an analogue method, and of controlling a BLDC motor in a digital method.
Figure 4:
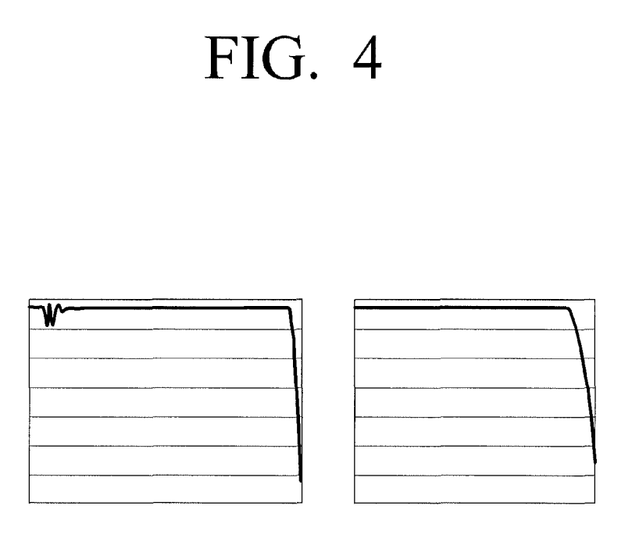

FIGS. 3 and 4 are graphs showing effects in the case of controlling the BLDC motor in an analogue method, and in the case of controlling the BLDC motor in a digital method.

In FIGS. 3 and 4, the X axis represents time while the Y axis represents speed.

In the Case of Controlling the BLDC Motor in an Analogue Method

When scanning both sides using a paper transfer device, it may be necessary to perform an operation of changing the rotation direction of the BLDC motor to scan both sides. That is, for this operation, the BLDC motor may repeat the following: a normal direction rotation—stop—reverse direction rotation—stop. In the case of controlling the BLDC motor in the conventional analogue method, when the BLDC motor speed reaches a constant speed, an overshoot (left side) or undershoot (middle) of speed may occur as in the left picture and the middle picture in FIG. 3. This is because in the case of controlling the BLDC motor in the analogue method, the gain value of the driving circuit for maintaining a constant speed is fixed to an external device using resistance and capacitor, and once the gain value is fixed, it cannot be changed until the components are replaced, and thus the constant speed can only be maintained in a certain speed band. (That is, it is possible to maintain the constant speed in a certain speed band according to the gain value of the driving circuit, but in speed bands that cannot be covered by the gain value of the driving circuit, an overshoot or undershoot occurs, delaying the time needed to reach the constant speed.) In this process, the overshoot or undershoot of speed causes sound to occur in the motor, and the user will hear irritating sound at every scanning.

In addition, the image scanning apparatus cannot directly see transferring of paper, and thus it performs scanning by determining the location of paper based on the speed at which the paper is transferred. For the same problem as the sound issue aforementioned, in the case of controlling the BLDC motor using the analogue method, when significant overshoot or undershoot occurs when driving the BLDC motor, a difference occurs in the actual transferred distance of the paper, causing difference in the front end margin in the scanned image definition. For instance, when there is speed change, in an actual image scanning apparatus, the user performs scanning determined that the paper moved in a constant speed at a certain time, but actually the paper is transferred further or less by the degree of the overshoot or the undershoot occurred. Therefore, the problem of incorrect front end margin occurs.

In addition, in the case of performing a scanning operation in an image scanning apparatus, when paper passes the transfer route, a load change occurs. If a load change occurs when controlling the BLDC motor using the analogue method, the control performance deteriorates, causing overshoot or undershoot of speed during a constant speed as in the left picture in FIG. 4. Such overshoot or undershoot of speed during a constant speed distorts the scanned image definition.

In the Case of Controlling the BLDC Motor in a Digital Method

The right side in FIG. 3 is a speed graph according to time in the case of controlling the BLDC motor in a digital method when scanning both sides of paper using a paper transfer device. Referring to the right side of FIG. 3, it can be seen that a constant speed may be reached directly without any overshoot or undershoot. This is because the gain value of the digital controlling unit 240 may be tuned to different values according to various speed bands, and thus it may be possible to maintain a constant speed in various speed bands. Therefore, there may be no overshoot or undershoot of speed, causing good sound characteristics during scanning.

In addition, speed may be maintained constant from the start, and thus the paper may be transferred to the determined location and no incorrect front end margin problem may occur.

In addition, in the case of controlling the BLDC motor using the digital method, different digital gain values may be used according to command speed and driving directions, and thus control performance may always be maintained constant, causing no change of speed in changing load. Therefore, it may be possible to resolve the problem of distortion of the scanned image definition.

Figure 5:
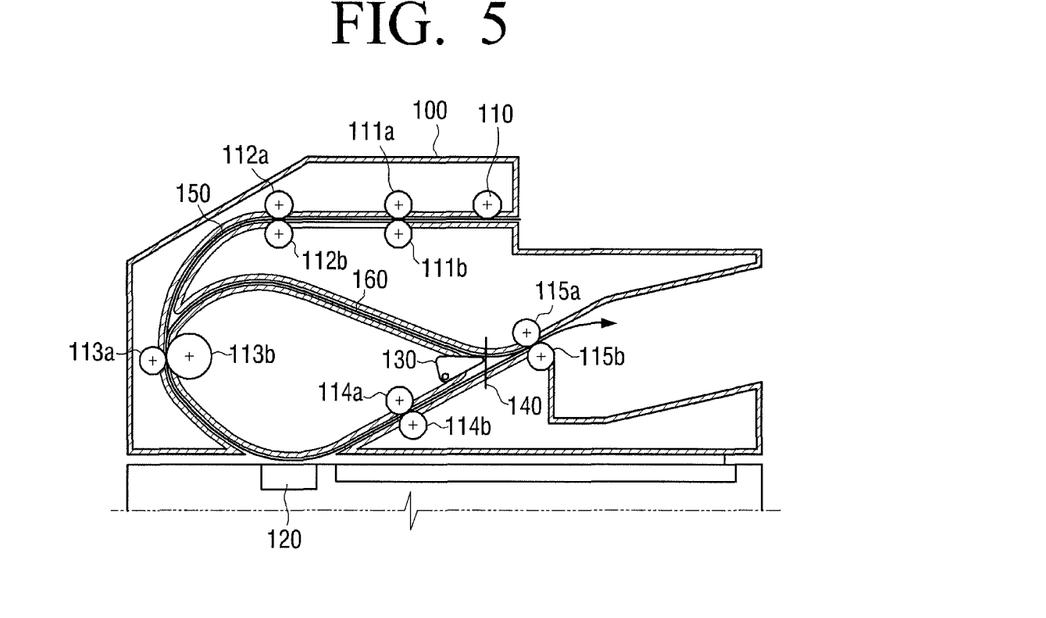
FIG. 5 is a cross-sectional view of an image scanning apparatus for explaining a one side scanning method and a both sides scanning method according to an exemplary embodiment of the present disclosure.

FIG. 5 is a cross-sectional view of an image scanning apparatus for explaining a one side scanning method and a both sides scanning method according to an exemplary embodiment of the present disclosure.

One Side Scanning Method

In the case of performing a one side scanning using the image scanning apparatus 100, the driving direction of the motor may be the normal direction. Paper may be picked up by a roller 110 as the motor is driven. Thereafter, the paper may be transferred by rollers 110, 111a, 112a which may be driven by the motor. Then, a front end of the paper may be sensed in the roller 113a by a before inlet sensor, and after a certain period of time, the paper may enter in line as the roller 113a is control driven. Then, the paper may be scanned as it passes the scanning unit 120 and passes a badge roller 115a.

By the above, a one side scanning process may be completed. That is, in the case of a one side scanning method, paper may be transferred through only route 150.

In this case, it may not be necessary to perform an additional control operation to stop the paper.

Both Sides Scanning Method

In the case of performing a both sides scanning using the image scanning apparatus 100, paper may be transferred in the same sequence as in the aforementioned one side scanning method, and may stop in position 140. When the paper is in position 140, the scanning unit 120 may have completed scanning one side of the paper. Then, when the stop position is between 140 and 115*a*, the paper can be transferred without any paper jam, and is transferred along route 160 by a reverse rotation of the motor. As the paper passes route 160 and the scanning unit 120 again, the other side (back side) may be scanned. Then, the paper may be transferred through route 160 once again and may be placed in line and in the right order.

Regarding Stopping Distance

To scan both sides, the paper should be transferred in the aforementioned method and the stop position should be between 140 and 115*a*. In this way the paper can be transferred without any jamming. Herein, in the case of the BLDC motor, the motor has a great inertia, and due to the characteristics of the motor, it cannot stop exactly at the stop position. Therefore, after a stop control occurs, position 140 may be secured for a certain distance or more, unlike in the conventional image scanning apparatus. That is, the following may be satisfied: position 140+stop dragging distance<position of roller 115*a*.

A stop dragging distance is a maximum figure of a stop distance after the motor stops per driving speed band. (The stop distance when the motor stops can be shortened when using a brake, and the higher the speed, the longer the stop distance. The stop distance can be shortened when using a direction conversion).

In the case of controlling the BLDC motor using an analogue method, since it is not possible to cover various speed bands, it is not easy to make a stop control. That is, according the gain value of an analogue type controller, paper jamming may occur when scanning both sides.

However, in the case of controlling the BLDC motor using the digital method according to an exemplary embodiment of the present disclosure, since it may be possible to cover various speed bands using various digital gain values, making a stop control may be easy.

Figure 6:
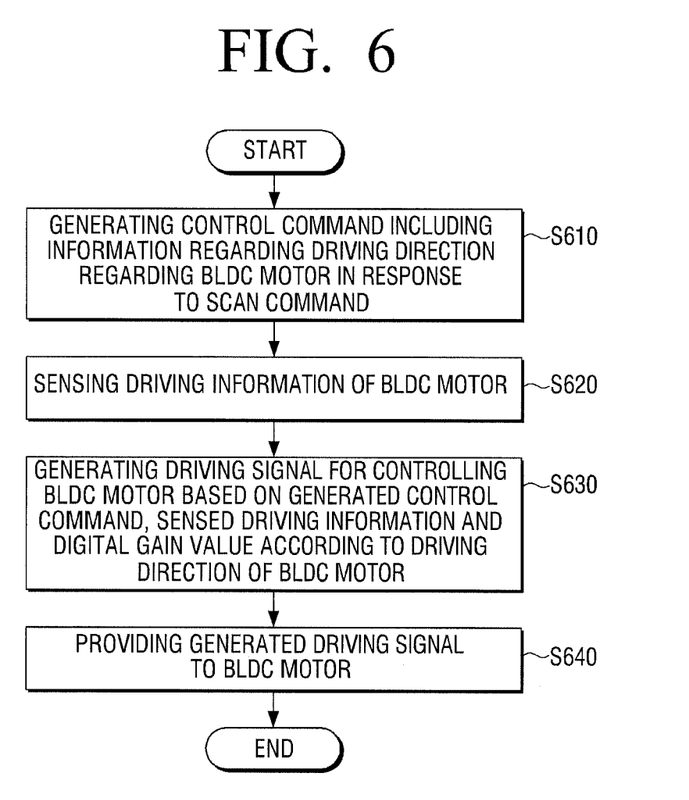
FIG. 6 is a flowchart illustrating a paper transfer method of an image scanning apparatus according to an exemplary embodiment of the present disclosure.

FIG. 6 is a flowchart for the paper transfer method of the image scanning apparatus according to an exemplary embodiment of the present disclosure. Referring to FIG. 6, a control command including information on driving direction regarding the BLDC motor may be generated in response to a scan command input in advance (S610). Then, driving information of the BLDC motor may be sensed (S620). Then, a driving signal for controlling the BLDC motor based on a digital gain value according to sensed driving information and the driving direction of the BLDC motor may be generated (S630).

The generated driving signal may be provided to the BLDC motor (S640). FIGS. 1 and 2 specifically illustrate the paper transfer method of the image scanning apparatus, and thus specific explanation on FIG. 6 will be omitted.

As aforementioned, according to various exemplary embodiments of the present disclosure, it may be possible to maintain a constant speed in various speed bands by controlling the BLDC motor in the digital method.

In addition, since it may be possible to maintain a constant speed in various speed bands, it is possible to reduce noise during operation, and resolve problems of incorrect front end margin, distortion of scanned images, and lengthening paper dragging distance during both sides scanning.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An image scanning apparatus comprising:
    a scanning unit which scans paper;
    a paper transfer unit which transfers the paper to the scanning unit using a Brushless DC (BLDC) motor;
    a sensor unit which senses driving information of the BLDC motor;
    a scan controlling unit which controls operations of the scanning unit, and generates a control command including information of a driving direction regarding the BLDC motor;
    a driving signal unit which generates a driving signal for controlling the BLDC motor; and
    a digital controlling unit which controls operations of the driving signal unit in a digital method based on the generated control command and a digital gain value according to the sensed driving information and the driving direction of the BLDC motor.

2. The image scanning apparatus according to claim 1, further comprising a storage unit which stores the digital gain value corresponding to a command speed and driving direction of the BLDC motor in a lookup table.

3. The image scanning apparatus according to claim 1, wherein the digital controlling unit comprises:
    an error detection unit which compares a speed command value and a driving direction within the generated control command with the sensed driving information, and calculates a digital error value;
    a calculating unit which calculates a Pulse Width Modulation (PWM) duty ratio of the BLDC motor using the calculated digital error value and the digital gain value; and
    a PWM generating unit which generates a PWM signal regarding the BLDC motor based on the calculated PWM duty ratio.

4. The image scanning apparatus according to claim 3, wherein the error detection unit comprises:
    a frequency error detection unit which compares the speed command value and the driving direction within the generated control command with the speed information of the BLDC motor, and calculates a frequency error value; and
    a phase error detection unit which compares the speed command value and the driving direction within the received control command with the speed information of the BLDC motor, and calculates a phase error value.

5. The image scanning apparatus according to claim 4, wherein the calculating unit calculates the PWM duty ratio by performing a shift calculation on the calculated frequency error value and the calculated phase error value and the digital gain value corresponding thereto.

6. The image scanning apparatus according to claim 1, wherein the sensor unit comprises:
    an electrical angle sensing unit which receives electrical angle information from a Hall sensor attached to the BLDC motor; and a speed sensing unit which receives speed information of the BLDC motor in a frequency form.

7. The image scanning apparatus according to claim 1, wherein the control command comprises a rotation direction regarding the BLDC motor, and further comprises at least one information of a speed command value, rotation start/stop, acceleration/deceleration, brake operation and lock time.

8. The image scanning apparatus according to claim 1, wherein the digital controlling unit comprises a register which stores the generated control command.

9. The image scanning apparatus according to claim 2, wherein the paper transfer unit transfers the paper to the scanning unit using a plurality of BLDC motors,
the sensor unit, the digital controlling unit and the driving signal unit are provided in plural so as to correspond to each of the plurality of BLDC motors, respectively, and
the communication interface unit transmits the received digital control command to the digital controlling unit corresponding to the received digital control command of the plurality of digital controlling units.

10. The image scanning apparatus according to claim 1, wherein the driving information is at least one of the electrical angle information of the BLDC motor and the rotation speed information of the BLDC motor.

11. A paper transfer method of an image scanning apparatus, the method comprising:
generating a control command which includes information on a driving direction regarding a BLDC motor in response to a scan command;
sensing driving information of the BLDC motor;
generating a driving signal for controlling the BLDC motor based on the generated control command and a digital gain value according to the sensed driving information and the driving direction of the BLDC motor; and
providing the generated driving signal to the BLDC motor.

12. The paper transfer method of an image scanning apparatus according to claim 11, wherein the generating the driving signal generates a driving signal using a lookup table which pre-stores a digital gain value corresponding to a command speed and driving direction of the BLDC motor.

13. The paper transfer method of an image scanning apparatus according to claim 11, wherein the generating the driving signal comprises:
comparing a speed command value and a driving direction within the generated control command with the sensed driving information, and calculating a digital error value;
calculating a PWM duty ratio of the BLDC motor using the calculated digital error value and the digital gain value; and
generating a PWM signal regarding the BLDC motor based on the calculated PWM duty ratio.

14. The paper transfer method of an image scanning apparatus according to claim 13, wherein the calculating the digital error value comprises:
comparing the speed command value and the driving direction within the generated control command with the speed information of the BLDC motor, and calculating a frequency error value; and
comparing the speed command value and the driving direction within the generated control command with the speed information of the BLDC motor, and calculating a phase error value.

15. The paper transfer method of an image scanning apparatus according to claim 14, wherein the calculating the PWM duty ratio calculates the PWM duty ratio by performing a shift calculation on the calculated frequency error value, the calculated phase error value, and the digital gain value corresponding thereto.

16. The paper transfer method of an image scanning apparatus according to claim 11, wherein the sensing the driving information of the BLDC motor comprises:
receiving electrical angle information from a Hall sensor attached to the BLDC motor; and
receiving speed information of the BLDC motor in a frequency form.

17. The paper transfer method of an image scanning apparatus according to claim 11, wherein the control command comprises a rotation direction regarding the BLDC motor, and further comprises at least one information of a speed command value, rotation start/stop, acceleration/deceleration, brake operation, and lock time.

18. The paper transfer method of an image scanning apparatus according to claim 11, wherein the driving information is at least one information of the electrical angle information of the BLDC motor and the rotation speed information of the BLDC motor.

19. An image scanning apparatus comprising:
a scanning unit which scans paper;
a paper transfer unit which transfers the paper to the scanning unit using a Brushless DC (BLDC) motor;
a sensor unit which senses driving information of the BLDC motor, the sensor unit comprising an electrical angle sensing unit which receives electrical angle information from a Hall sensor attached to the BLDC motor, and a speed sensing unit which receives speed information of the BLDC motor in a frequency form;
a scan controlling unit which controls operations of the scanning unit, and generates a control command including information of a driving direction regarding the BLDC motor;
a driving signal unit which generates a driving signal for controlling the BLDC motor;
a digital controlling unit which controls operations of the driving signal unit in a digital method based on the generated control command and a digital gain value according to the sensed driving information and the driving direction of the BLDC motor; and
an error detection unit which compares a speed command value and a driving direction within the generated control command with the sensed driving information, and calculates a digital error value.

20. The image scanning apparatus according to claim 19, wherein the error detection unit comprises:
a frequency error detection unit which compares the speed command value and the driving direction within the generated control command with the speed information of the BLDC motor, and calculates a frequency error value; and
a phase error detection unit which compares the speed command value and the driving direction within the received control command with the speed information of the BLDC motor, and calculates a phase error value.

* * * * *